Jan. 25, 1966   G. P. CARVER ETAL   3,230,769
PNEUMATIC GAUGE SYSTEM
Filed June 11, 1962
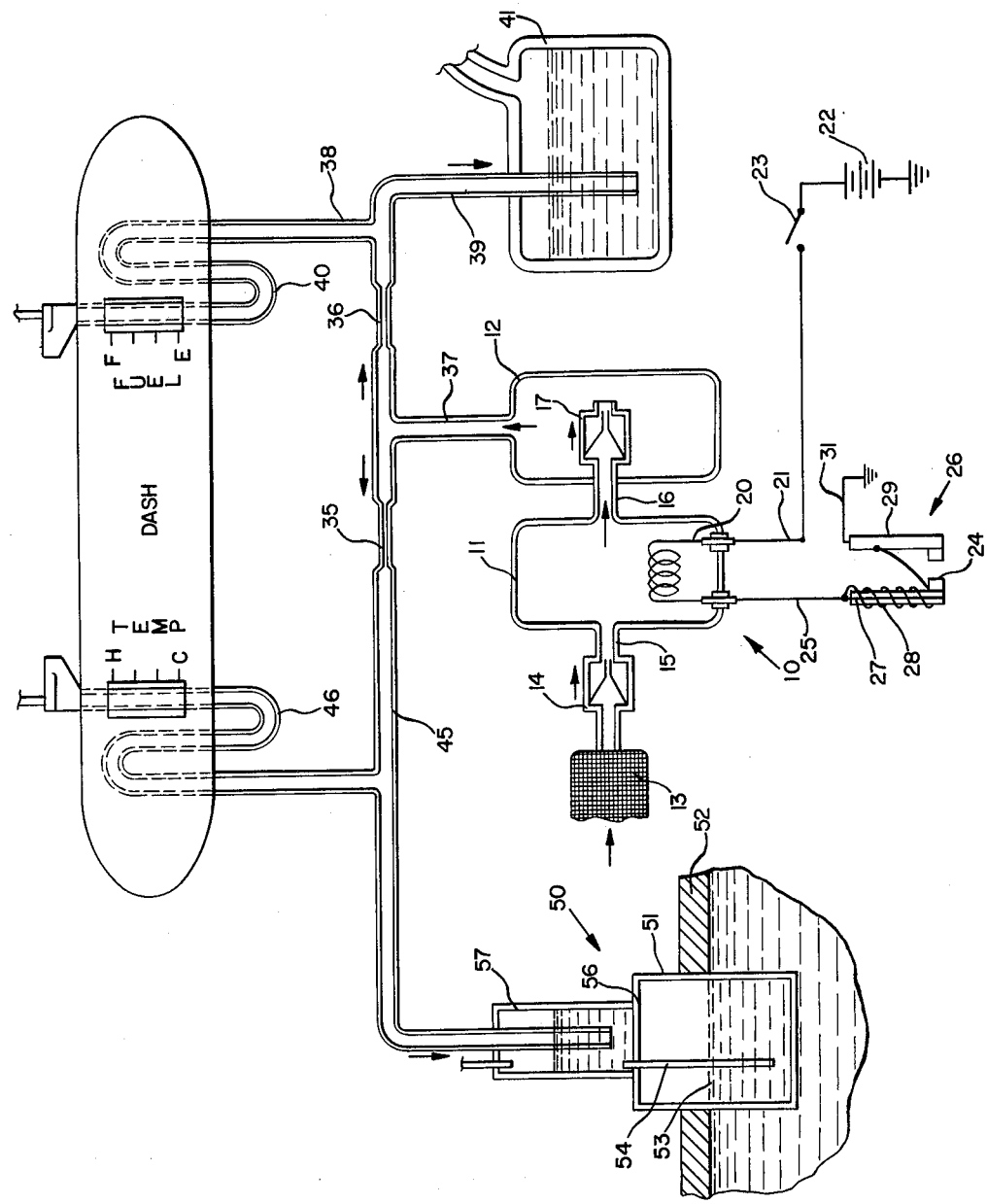
GEORGE P. CARVER
CHARLES E. HALLUM
INVENTOR
BY John C. Faulkner
   Keith L. Borschling
ATTORNEYS United States Patent Office 3,230,769
Patented Jan. 25, 1966

3,230,769
PNEUMATIC GAUGE SYSTEM
George P. Carver, Newport Beach, and Charles E. Hallum, Costa Mesa, Calif., assignors to Ford Motor Company, Dearborn, Mich., a corporation of Delaware
Filed June 11, 1962, Ser. No. 201,408
1 Claim. (Cl. 73—292)

This invention relates to a gauge system. More particularly, the invention relates to an improved gauge system of the type disclosed in U.S. Patent No. 1,687,506 to A. Novick, issued on October 16, 1928.

The invention utilizes an electric heater coil type pump which is operated by a cycle switch to force air through a plurality of isolating restrictors to a plurality of pressure transducer units. The pressure transducer units cooperate with the pump to cause a back pressure to be developed which is proportional to the variable being measured. The back pressure is transmitted to a liquid manometer which functions as a visual indicating means for indicating the value of the variable or variables being measured. This gauge system may be utilized in various types of vehicles for measuring the operating temperature of the engine, the fuel level and many other of the variables of vehicle operation.

The instant invention has the advantage of utilizing only one moving part. Further, the assembly may be constructed from relatively inexpensive standard parts which can be easily installed in most vehicles.

It is the general object of the invention to provide an improved gauge system;

Another object of this invention is the provision of an improved gauge system for an automotive vehicle;

Another object of this invention is the provision of a gauge system utilizing an improved pump;

Another object of this invention is the provision of an improved gauge system having a minimum of moving parts;

Other objects of this invention will become obvious as the detailed written description is considered with the drawing, which is a schematic drawing of the preferred embodiment of the gauge system.

Referring to the drawing, the gauge system includes a pump 10 having an inlet housing or reservoir 11 and an outlet housing or reservoir 12. The inlet housing 11 has a filter 13 and an inlet valve 14 that are connected to a port 15 which permits air to enter the inlet housing 11. The inlet valve 14 is a one-way valve which is well known in the prior art and permits air to enter the inlet housing 11 while preventing air from flowing out of the inlet housing. The inlet housing 11 and the outlet housing 12 are connected by a port 16 and a one-way outlet valve 17 which permits air to flow from the inlet housing 11 to the outlet housing 12 but prevents flow in the opposite direction.

A heater or electric heater coil 20 is located in the interior of the inlet housing 11 and is connected by a conductor 21 to the battery 22 via normally open ignition switch contacts 23. The heater coil 20 is connected by the conductor 25 to a cycle switch 26. The cycle switch 26 includes a bimetal element 27 having a first contact 24 which is electrically connected through the bimetal element 27 to the conductor 25 and a switch heater coil element 28 which is electrically connected to the conductor 25 and to a second contact 29. The second contact 29 is located adjacent the first contact 24 and is connected to ground by a conductor 31.

The energization of the switch heater coil 28 will cause the bimetal 27 to deflect so that the first contact 24 will eventually abut the second contact 29 to electrically connect the bimetal 27 to ground. The closing of the first and second contacts 24 and 29 completes a circuit from the heater coil 20 to ground and short circuits the switch heater coil 28 permitting it and the adjacent bimetal 27 to cool which eventually will result in the opening of contacts 24 and 29.

The outlet housing 12 is connected to the flow restrictors 35 and 36 by the conduit 37. The flow restrictor 36 is connected by the conduits 38 and 39 to a manometer 40 and the fuel tank 41 respectively. The conduit 39 extends into the fuel tank 41 and will usually be submerged in fuel, thereby causing a back pressure to any air flow in the conduit 39 which is proportional to the amount of fuel in the tank 41. The tank 41 and the conduit 39 may be considered to be a pressure transducer for causing a pressure proportional to the amount of fuel in the fuel tank.

The flow restrictor 35 is connected by a conduit 45 to a visual indicating means or manometer 46 for indicating the operating temperature of the automotive vehicle. The conduit 45 is also connected to a thermal plug 50 which may be considered a pressure transducer means for causing a pressure proportional to the operating temperature of the engine. The thermal plug 50 has a lower housing 51 which is rigidly connected to the engine block 52. The lower housing 51 contains a fluid 53 and a standpipe or passageway 54 which is fastened to a diaphragm or wall 56. The standpipe 54 connects the lower housing 51 and the upper housing 57 and permits fluid to flow from the lower housing 51 to the upper housing 57. The amount of fluid that flows from the lower housing 51 to the upper housing 57 is proportional to the temperature of the engine block 52. This fluid submerges the end of the conduit 45 causing a back pressure to any air flow in conduit 45 which is proportional to the temperature of the engine block 52.

In summary, the operator of the vehicle will close the ignition switch which results in the closing of the contacts 23. The closing of contacts 23 causes a voltage to be applied to the electric heater 20 and the switch heater coil 28. With both the electric heater coil 20 and the switch heater coil 28 in circuit, any air in the inlet housing 11 will not be substantially heated. The energization of the switch heater coil 28 causes the bimetal 27 to deflect which results in the first contact 24 abutting the second contact 29. The closing of the contacts 24 and 29 causes the switch heater coil 28 to be short circuited, whereby substantially all of the voltage drop in the circuit occurs across the electric heater coil 20. This permits the electric heater coil 20 to raise the temperature of the air in the inlet housing 11 which forces air to flow through the outlet valve 17 and into the outlet housing 12 and through conduits 37, 39, and 45. In the meantime, the switch heater coil 28 which is short circuited and the bimetal 27 are permitted to cool and subsequently open the electrical connection between the first contact 24 and the second contact 29 resulting in a lower voltage being applied to the electric heater coil 20. The lower voltage drop across the electric heater coil 20 permits the walls of the inlet housing 11 to absorb heat from the air in the interior of the housing and radiate externally to cool the inlet housing 11. The cooling of the housing causes a reduction of the air volume and pressure and consequently a drawing in of air through the inlet valve 14. The foregoing pump cycle is continuously repeated so long as the ignition switch is in a closed position.

The pumping action described above forces air through the conduit 37 and the flow restrictors 35 and 36. The flow restrictors 35 and 36 isolate the manometer 40 and the tank 41 from the manometer 46 and the thermal plug 50. For example, when the temperature is low, the restrictor 35 keeps the pressure in the outlet housing 12 high enough to operate the manometer 40 when the tank 41 is virtually full. The flow through the flow restrictor 36 causes a back pressure to exist in the conduit 38 which is proportional to the amount of fuel which is in the tank 41. This back pressure causes the fluid in the manometer 40 to visually indicate the amount of fuel in the tank 41. The flow through the flow restrictor 35 is transmitted to the upper housing 57 of the thermal plug 50 which contains a varying amount of fluid dependent upon the temperature of the engine block 52. The fluid in the upper housing 57 will cause a back pressure to exist in the conduit 45 which is proportional to the temperature of the engine block or the engine which in turn will result in the manometer 46 visually indicating the operating temperature of the engine.

In the foregoing detailed description, it should be obvious that the applicants have invented a gauge system which embodies the utmost in simplicity while providing a reliable measuring and indicating system. The basic elements utilized in the combination assembly are all commercially available, and for this reason, the invention may be easily assembled and installed in virtually any vehicle.

It will be understood that the invention is not to be limited to the exact construction shown and described and that various changes and modifications may be made without departing from the spirit and scope of the invention, as defined in the appended claim.

What is claimed is:

A gauge system comprising, a first pressure transducer means for causing a back pressure proportional to a first variable, a second pressure transducer means for causing a back pressure proportional to a second variable, a first indicating means connected to said first pressure transducer means, a second indicating means connected to said second pressure transducer means, a pump having an outlet reservoir, a first conduit connecting said outlet reservoir to said first indicating means and said first pressure transducer means, a second conduit connecting said outlet reservoir to said second indicating means and said second pressure transducer means, said first and said second conduits including flow restriction means, said pump comprising an inlet housing having an inlet for permitting fluid to enter said inlet housing and an outlet coupled to said outlet reservoir for permitting flow from said inlet housing into said outlet reservoir, a heater operatively coupled to said inlet housing for heating the fluid in said inlet housing and a cycle switch for periodically energizing said heater whereby fluid flows through said inlet housing to said outlet reservoir and to said first and said second pressure transducer means and said first and said second visual indicating means through said first and second conduits including said flow restriction means.

References Cited by the Examiner

UNITED STATES PATENTS

| | | | |
|---|---|---|---|
| 937,858 | 10/1909 | Phelps. | |
| 1,598,571 | 8/1926 | Fox | 73—302 X |
| 1,630,943 | 5/1927 | Hutton | 230—69 |
| 1,687,506 | 10/1928 | Novick | 73—302 |
| 1,758,077 | 5/1930 | Fentress | 73—302 |
| 2,731,825 | 1/1956 | LeVan. | |
| 2,889,631 | 6/1959 | Worral. | |

LOUIS R. PRINCE, *Primary Examiner.*

ISAAC LISANN, *Examiner.*